United States Patent [19]

Whateley et al.

[11] 4,065,981

[45] Jan. 3, 1978

[54] GEARING

[75] Inventors: Eric Albert Whateley, Huddersfield; Eric Alexander Pengilly, Newbury, both of England

[73] Assignee: David Brown Gear Industries Limited, Huddersfield, England

[21] Appl. No.: 495,415

[22] Filed: Aug. 7, 1974

Related U.S. Application Data

[63] Continuation of Ser. No. 148,328, June 1, 1971, abandoned.

[30] Foreign Application Priority Data

June 5, 1970 United Kingdom ............... 27423/70

[51] Int. Cl.² .................... F16H 3/08; F16H 57/00
[52] U.S. Cl. ........................................ 74/410; 74/331
[58] Field of Search ......... 74/331, 410, 745, 665 GD, 74/665 G

[56] References Cited

U.S. PATENT DOCUMENTS

| | | | |
|---|---|---|---|
| 2,516,077 | 7/1950 | Schmitter | 74/410 |
| 2,712,761 | 7/1955 | Chung | 74/410 |
| 2,982,144 | 5/1961 | Wallgren | 74/410 |
| 2,995,046 | 8/1961 | Mansachs | 74/410 |
| 3,105,395 | 10/1963 | Perkins | 74/745 |
| 3,283,613 | 11/1966 | Perkins | 74/745 |
| 3,293,933 | 12/1966 | Foxwell | 74/745 X |
| 3,648,546 | 3/1972 | McNamara et al. | 74/331 X |
| 3,817,123 | 6/1974 | Whateley et al. | 74/745 |
| 3,885,446 | 5/1975 | Pengilly | 74/745 X |

FOREIGN PATENT DOCUMENTS 999,944  7/1965  United Kingdom ............... 74/410

*Primary Examiner*—Samuel Scott
*Assistant Examiner*—Carl F. Pietruszka
*Attorney, Agent, or Firm*—Norris & Bateman

[57] ABSTRACT

Power transmission gearing has two countershafts both of which are mounted with virtually no capability of axial movement and drivably connected to a common driving shaft and a common driven shaft by gearing. The gearing which connects the countershafts to the driven shaft conprises a single helical gear of one hand on one of the countershafts, a single helical gear of the other hand on the other of the countershafts, and a double-helical gear assembly on the driven shaft, one toothed zone of the doublehelical gear assembly meshing with one of the single helical gears and the other toothed zone of said assembly meshing with the other of said gears. The double-helical gear assembly is capable of axial movement on the driven shaft to equalize the torque transmitted by each countershaft.

3 Claims, 2 Drawing Figures

GEARING

This is a continuation of application Ser. No. 148,328, filed June 1, 1971, now abandoned.

BACKGROUND OF THE INVENTION

The invention relates to gearing, and more particularly to power transmission gearing of the type having two countershafts capable of transmitting torque simultaneously.

SUMMARY OF THE INVENTION

The object of the invention is to avoid the need for complex radially floating components as employed hitherto in gearing of the type referred to.

According to the invention, gearing including means for sharing in fixed proportions the transmission of torque between two parallel or coaxial shafts by way of two countershafts parallel to said shafts comprises a double-helical gear assembly mounted without axial restraint on one of said shafts, a single helical gear on one countershaft meshing with that zone of the double-helical gear assembly having helical teeth of one hand, a single helical gear on the other countershaft meshing with that zone of the doublehelical gear assembly having helical teeth of the other hand, and gears for drivably connecting the other of said shafts to both of the countershafts.

BRIEF DESCRIPTION OF THE DRAWING

A preferred embodiment of the invention will now be described, by way of example only, with reference to the accompanying drawing of which.

DESCRIPTION OF THE PREFERRED EMBODIMENT

Figure 1:
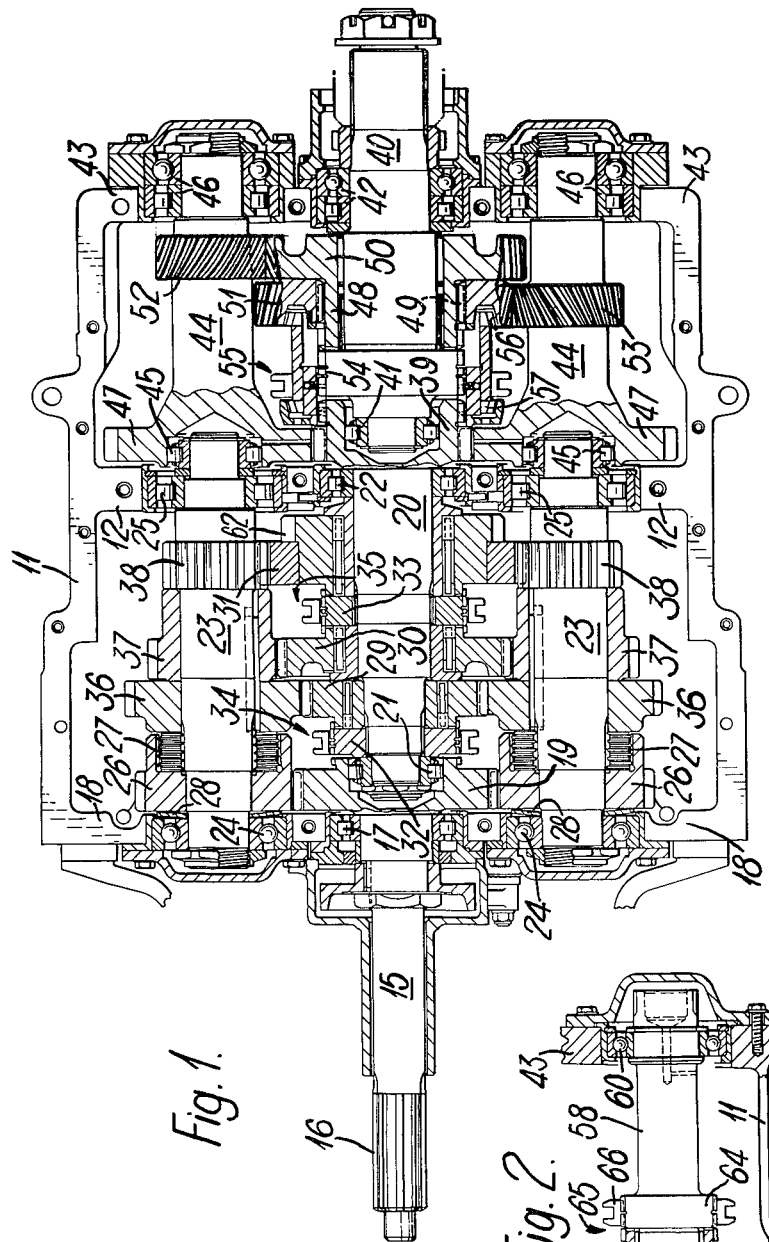
FIG. 1 is a sectional side elevation arrangement of a gearbox for a commercial vehicle.
Figure 2:
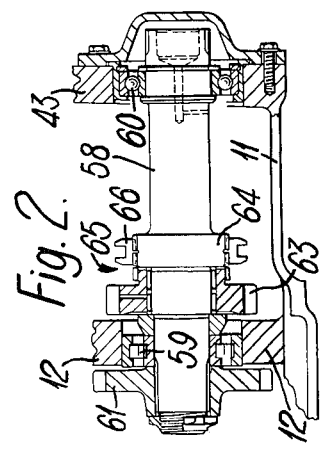
FIG. 2 is a sectional view of reverse gearing in said gearbox.

Referring now to the drawing, a gearbox for a commercial vehicle comprises a single casing 11 with a transverse web 12 housing multi-speed gearing at the front side of said web and two-speed gearing, connected in series with the multi-speed gearing, at the rear side of said web. The multi-speed gearing and the two-speed gearing are also connectible by reverse gearing as hereinafter described. The two-speed gearing acts in known manner to double the number of forward and reverse speed ratios obtainable.

The multi-speed gearing comprises an input shaft 15 adapted to be supported at its projecting front end in a bearing (not shown) housed in the vehicle's engine flywheel (not shown) and adapted to carry on splines 16 the plates of a main power transmission friction clutch (not shown). The shaft 15 is supported near its rear end in a bearing 17 housed in a front wall 18 of the casing 11, and has formed integrally at its rear end an input gear 19. A main shaft 20 co-axial with the input shaft 15 is supported at its front end in a bearing 21 housed in the input gear 19, and adjacent its rear end in a bearing 22 housed in the transverse web 12. Two identical layshafts 23 are disposed parallel to and equidisant from the main shaft 20 on diametrically opposite sides thereof. Each layshaft 23 is supported at its front end in a bearing 24 housed in the front wall 18 of the casing 11 and adjacent its rear end in a bearing 25 housed in the transverse web 12. Adjacent the front end of each layshaft 23 there is mounted a gear 26 which meshes constantly with the input gear 19 and which is drivably connected to its layshaft 23 by a torque limiting multiplate friction clutch 27 loaded by a Belleville washer 28. The torque limiting clutches 27 are of equal torque transmitting capacity, and the value of the maximum torque transmissible by each of said clutches 27 is substantially greater than half the maximum torque to be transmitted by the gearbox, for example where the maximum torque to be transmitted by the gearbox is 1100 pound-feet, the maximum torque transmissible by each torque limiting clutch 27 may be 600 pound-feet. Three gears 29, 30 and 31 of different pitch circle diameters are rotatably mounted on the main shaft 20 forward of the transverse web 12, and rigidly secured on said shaft 20 are the hubs 32 and 33 of two double-ended dog clutches 34 and 35 which are operated in known manner by respective selector forks (not shown) and which are provided in known manner with clutch locks to prevent them jumping out of engagement. The clutches 34 and 35 have neutral positions. The clutch 34 enables the input shaft 15 to be drivably connected directly to the main shaft 20 or the gear 29 to be connected to the main shaft, and the clutch 35 enables either one of the gears 30 and 31 to be drivably connected to the main shaft. The gears 29, 30 and 31 mesh constantly with respective pairs of gears 36, 37 and 38. Each pair of gears 36 and 37 is rigidly secured one on each of the layshafts 23, and each of the gears 38 is formed integrally with its layshaft 23. Thus the main shaft 20 can be driven at any one of four speeds relative to the speed of the input shaft 15. At the rear end of the main shaft 20 there is formed integrally a gear 39 which constitutes the forward speed input to the two-speed gearing.

The foregoing multi-speed gearing is disclosed and claimed in U.S. Pat. No. 3,817,123 issued to applicants on June 18, 1974.

The two-speed gearing comprises an output shaft 40 co-axial with the input and main shafts 15 and 20 which is supported at its front end in a bearing 41 housed in the gear 39 and adjacent its projecting rear end in a bearing assembly 42 housed in a rear wall 43 of the casing 11. Each of two countershafts 44 co-axial with the layshafts 23 is supported at its front end on a bearing 45 surrounding the rear end of the associated layshaft 23, and at its rear end by a bearing assembly 46 housed in the rear wall 43 and adapted to locate the countershaft 44 relative to the casing 11 with no capability of axial movement apart from normal working clearances. The gear 39 meshes constantly with a pair of gears 47 formed integrally one on each of the countershafts 44. A first single helical gear 50 is rotatably mounted on the output shaft 40 with the capability of limited axial movement relative to said shaft. The gear 50 has a boss 48 provided with splines 49 on which a second helical gear 51 is mounted. The gears 50 and 51 are of opposite hand but of the same face width, pitch circle diameter and helix angle. Said gears 50 and 51 form, in effect, an axially floating double-helical gear assembly having oppositely handed helical toothed zones. The single helical gear 50 meshes constantly with a single helical gear 52 formed integrally on one countershaft 44, and the single helical gear 51 meshes constantly with a single helical gear 53 formed integrally on the other countershaft 44. The hub 54 of a double-ended dog clutch 55 is formed integrally on the output shaft 40. Said clutch is operated by a selector fork (not shown) and provided with a clutch lock, and is also provided with synchromesh cone clutches 56 and 57. The dog clutch 55 has no neutral position and enables the output shaft 40 to be drivably connected either to the double-helical gear assembly 50, 51 or directly to the main shaft 20.

The reverse gearing comprises a reverse shaft 58 parallel to the other shafts and supported adjacent its front end in a bearing 59 housed in the transverse web 12 and at its rear end in a bearing 60 housed in the rear wall 43 of the casing 11. Rigidly secured on the front end of the reverse shaft 58 is a gear 61 meshing constantly with a gear 62 rigidly secured to the gear 31 which has the largest pitch circle diameter of the three rotatably mounted gears on the main shaft 20 and thus transmits the lowest speed ratio. Rotatably mounted on the reverse shaft 58 is a gear 63 which meshes constantly with one of the gears 47. Formed integrally on the reverse shaft 58 is the hub 64 of a single-ended dog clutch 65 which is operated by a selector fork and provided with a clutch lock. Said dog clutch has a neutral position and enables the gear 63 to be drivably connected to the reverse shaft 58 when both of the dog clutches 34 and 35 are in neutral position.

In operation, an input torque up to the maximum value transmissible by each torque limiting clutch 27 is transmitted entirely by whichever layshaft 23 chances to have its gear 26 in tooth flank contact with the input gear 19. When the torque exceeds said value the torque limiting clutch 27 of said layshaft slips so that the torque in excess of said value is transmitted by the other layshaft. Thus in no circumstances is the torque shared equally between the layshafts 23 of the multi-speed gearing, but when the output shaft 40 is clutched to the double-helical gear assembly 50, 51 the torque is always shared equally between the countershafts 44 of the two-speed gearing due to said assembly being moved axially, by any inequality in the opposed axial components of the loads applied normal to its oppositely handed teeth, into an equilibrium position in which said components exert equal and opposite end thrusts.

In a modification, the reverse gearing is associated solely with the multi-speed gearing, and the gear at the rear end of the main shaft constitutes the input to the two-speed gearing for both forward and reverse speeds.

In another modification, the double-helical gear assembly has oppositely handed toothed zones of different pitch circle diameters, and thus said zones require different helix angles and/or pressure angles. For example, the gear at the rear end of the main shaft can have 20 teeth and mesh with a gear on one countershaft having 40 teeth, the other gear on said countershaft having 20 teeth and meshing with one zone of the double-helical gear assembly which has 40 teeth, thus giving a speed reduction of 4:1. The other countershaft must give the same speed reduction but this can be achieved by providing it with a gear having 20 teeth meshing with the gear at the rear end of the layshaft and a gear having 8 teeth meshing with the other zone of the double-helical gear assembly which has 32 teeth. In this case the countershafts will rotate at different speeds and transmit different torques which are directly proportional to said speeds, and in order to equalise the opposed axial components of the loads applied normal to the oppositely handed teeth of the double-helical gear assembly the helix angles of its toothed zones are made appropriately different to one another.

In a further modification, more than two layshafts are provided. For example, where three layshafts are provided and the maximum torque to be transmitted by the gearbox is 1100 pound-feet, the maximum torque transmissible by each torque limiting clutch may be 400 pound-feet.

In yet another modification, the torque limiting multi-plate friction clutches on the layshafts of the multi-speed gearing are dispensed with and the input gear is an axially floating double-helical gear assembly having oppositely handed helically toothed zones one of which meshes constantly with a single helical gear rigidly secured on one of the layshafts while the other of said zones meshes constantly with a single helical gear rigidly secured on the other of the layshafts.

We claim:

1. Change-speed gearing comprising an input shaft, an output shaft co-axial with the input shaft, said shafts being mounted for rotation about a fixed common axis only, two countershafts parallel to said shafts, a double-helical gear assembly rotatably mounted on said output shaft by means providing limited axial float of said assembly along said output shaft so as to share in fixed proportions the transmission of torque between the countershafts, a single-helical gear on one countershaft meshing constantly with that zone of the double-helical gear assembly having helical teeth of one hand, a single-helical gear on the other countershaft meshing constantly with that zone of the double-helical gear assembly having helical teeth of the other hand, gearing constantly drivably connecting said input shaft to both of the countershafts and comprising a gear fixed on said input shaft meshed constantly with a gear fixed on each of said countershafts, and clutch means for selectively drivably connecting said output shaft either directly to said input shaft or to the double-helical gear assembly without impeding the axially floating action of said assembly.

2. Change-speed gearing as defined in claim 1 wherein said double-helical gear assembly comprises as a first zone a first single-helical gear rotatably mounted on said output shaft and having limited slidable axial movement on said output shaft, and said other zone comprises a second single-helical gear of opposite hand from said first single-helical gear non-rotatably mounted on a hub portion of said first single helical gear.

3. Change-speed gearing as defined in claim 1 wherein said clutch means comprises a clutch sleeve longitudinally slidably mounted on said output shaft and having sets of clutch teeth at opposite ends, a set of clutch teeth on said gear that is fixed on the input shaft adapted to be engaged by the set of clutch teeth at one end of the sleeve in one position of the sleeve for directly connecting the input and output shafts, and a set of clutch teeth on said double-helical gear assembly adapted to be engaged by the set of clutch teeth at the other end of said sleeve whereby to connect said output shaft for rotation with said double-helical gear assembly in another position of said sleeve, and means for selectively moving said sleeve between said positions.

* * * * *